May 16, 1944.　　　　H. D. KADZ　　　　2,348,910
CARRYING SCRAPER
Filed March 4, 1942　　　3 Sheets-Sheet 1

Ground Line for Carrying

INVENTOR.
Harold D. Kadz,
BY
Edwin D. Jones, ATTY.

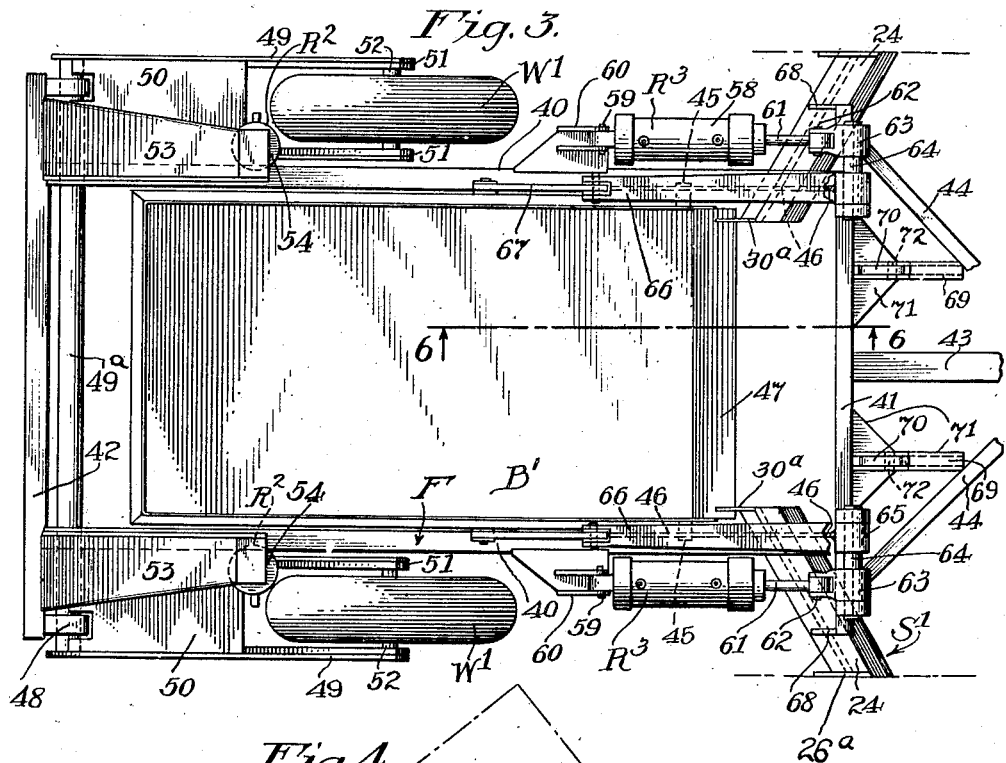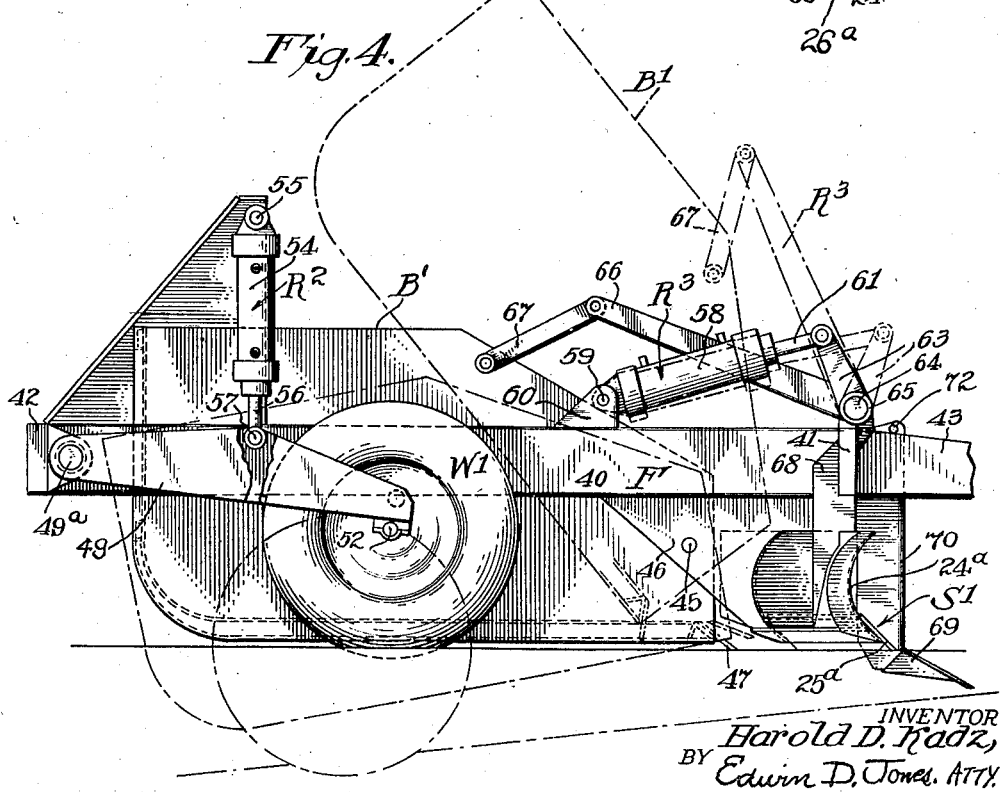

May 16, 1944.  H. D. KADZ  2,348,910
CARRYING SCRAPER
Filed March 4, 1942   3 Sheets-Sheet 3
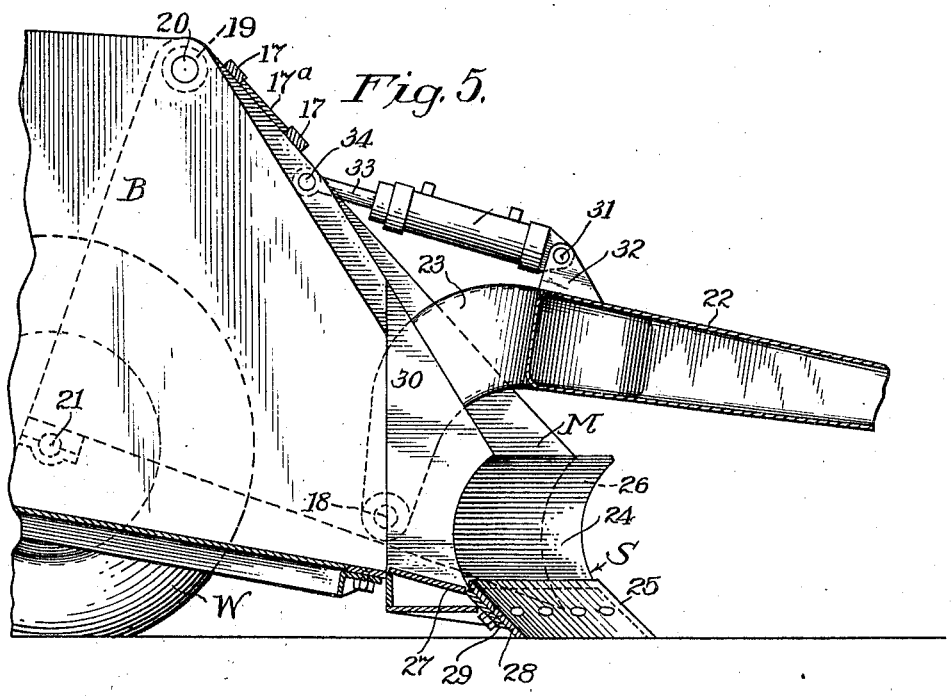
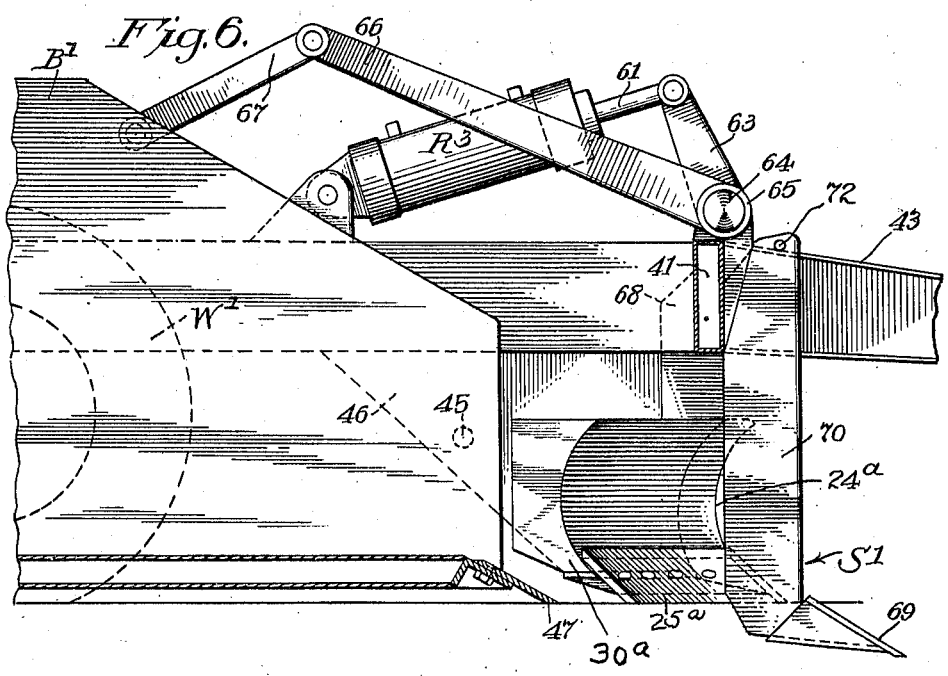
INVENTOR.
Harold D. Kadz,
BY Edwin D. Jones
ATTORNEY.

Patented May 16, 1944

2,348,910

UNITED STATES PATENT OFFICE 2,348,910

CARRYING SCRAPER

Harold D. Kadz, Glendale, Calif., assignor to Kay-Brunner Steel Products, Inc., a corporation of Delaware Application March 4, 1942, Serial No. 433,283

7 Claims. (Cl. 37—129)

My invention relates to carrying scrapers, and particularly, although not necessarily, to that type of carrying scraper having a bowl mounted in a frame supported on a pair of wheels, and adapted to be drawn by a tractor to scrape earth into the bowl from the surface of the ground, for the purpose of leveling the ground and transporting the earth accumulated as a result of such leveling to some point where it is dumped.

Two-wheel carrying scrapers of this type as heretofore proposed, have been ineffective to level uneven ground, because the wheels are disposd to opposite sides of the bowl, and, therefore, the wheels advance in paths at opposite sides of the path of the scraping blade of the bowl. In consequence the ground over which the wheels advance, remains uneven to cause them to move vertically together or separately. This raises or lowers the bowl and its scraper blade or tilts them from end to end. In any case the level position of the scraper blade is disturbed to prevent proper leveling of the ground.

It is a purpose of my invention to provide, in a carrying scraper of the character described, means which operate under forward movement of the scraper to level paths for and in advance of the wheels, so that irrespective of the unevenness of the ground the wheels will move over level surfaces and thus maintain the scraping edge of the bowl horizontally to cause it to level the surface of the ground.

It is also a purpose of my invention to provide in a two-wheel type of carrying scraper, means for supporting the bowl to occupy loading, carrying, and dumping positions, and mechanisms for moving the bowl to any one of the three aforementioned positions.

A further purpose of my invention is the provision in a two-wheel carrying scraper as defined in the preceding paragraph, wherein scraping implements are disposed in advance of the wheels to scrape the ground in a manner to define level paths for the wheels, and to guide the earth scraped by the leveling action, into the bowl.

Another purpose of my invention is the provision of scraping implements as above delineated, wherein they extend laterally beyond the wheels so as to scrape the ground at the bottom of curbings, embankments and the like, where the bowl blade of the conventional scraper cannot reach.

I will describe only two forms of carrying scrapers, each embodying my invention, and will then point out the novel features thereof in claims.

In the accompanying drawings:

Fig. 3 is a view showing in top plan another form of carrying scraper embodying my invention.

Fig. 4 is a view showing the scraper of Fig. 3 in side elevation, and other positions of the bowl and the operating mechanism in broken lines.

Fig. 5 is an enlarged fragmentary vertical sectional view taken on the line 5—5 of Fig. 1.

Fig. 6 is a view similar to Fig. 5 taken on the line 6—6 of Fig. 3.

Similar reference characters refer to similar parts in each of the several views.

Figure 1:
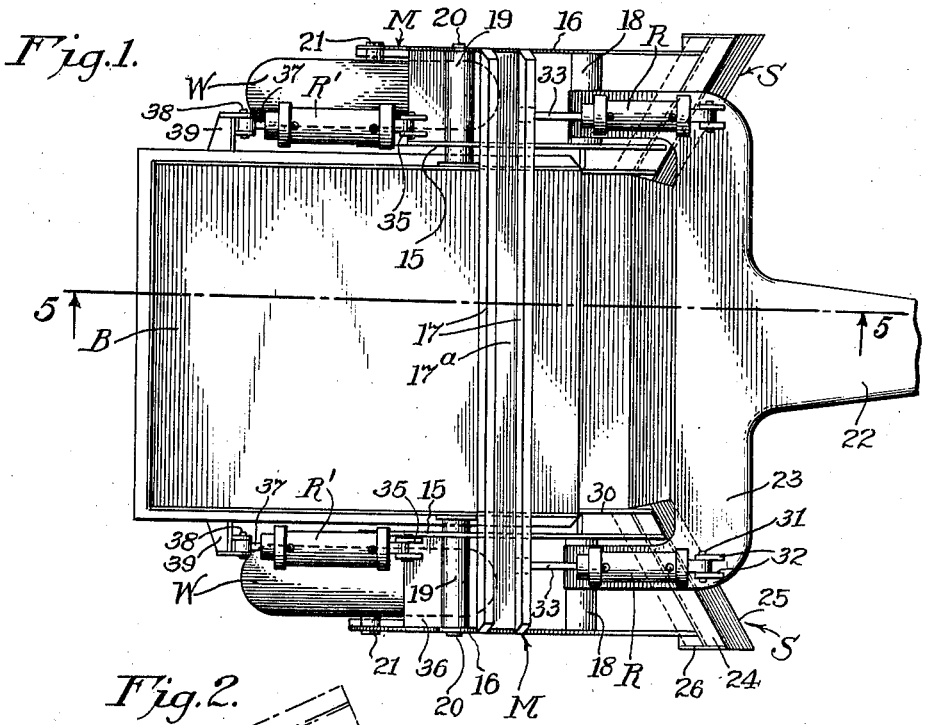
Fig. 1 is a view showing in top plan one form of carrying scraper embodying my invention.
Figure 2:
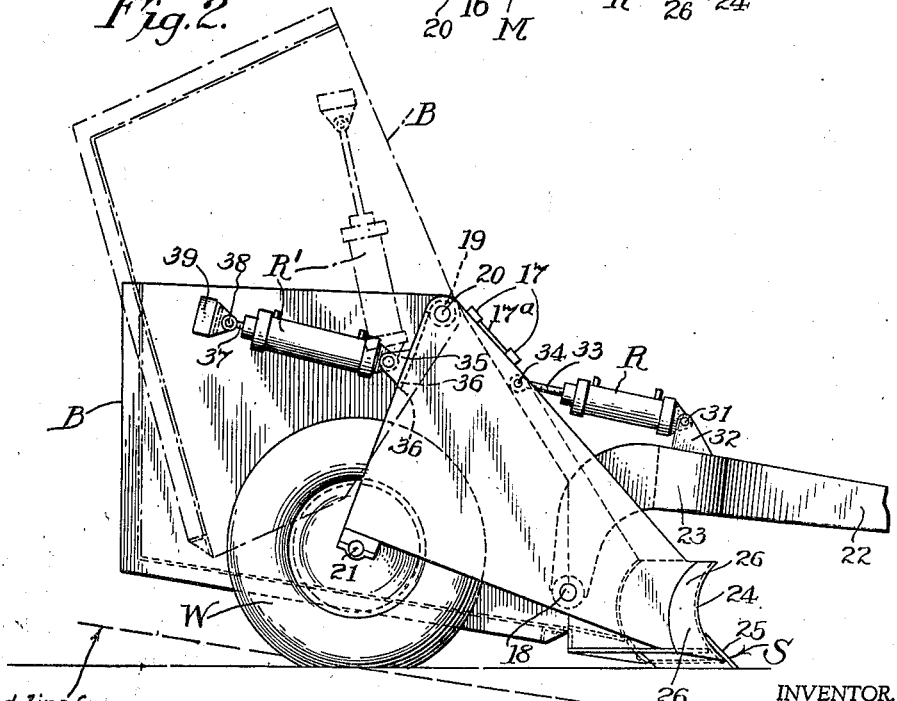
Fig. 2 is a view showing the carrying scraper of Fig. 1 in side elevation, with the scraping or loading position of the bowl illustrated in solid lines, and the dumping position of the bowl illustrated in broken lines.

The form of carrying scraper shown in Figs. 1, 2, and 5, comprises a frame made up of two side members M identical in construction, and each comprising an inner vertical plate 15 and an outer vertical plate 16. These two plates 15 and 16 are secured to each other and to the plates of the other pair by means of a pair of cross bars 17 extending across and secured to the upper edges of the plates. These cross bars may be secured to a cross plate 17a with the latter in turn secured to the upper edges of the plates 15 and 16. The plates of each pair are secured in spaced parallelism by a stub axle 18, and a sleeve 19 which is disposed at the upper corners of the plates and provides a bearing for a stub shaft 20 fixed to and projecting from the adjacent side of a bowl B. Thus, with the two stub shafts 20 mounted in the sleeves 19, the bowl B is supported on the frame members M for pivotal movement about the stub shafts 20 as a center.

At the lower rear corner of each pair of plates 15 and 16, are mounted stub axles 21 for a pair of wheels W, and, in the present instance, these wheels are shown as provided with pneumatic tires. The stub axles 21 extend between the plates of each pair, so that the wheels themselves are disposed between the plates 15 and 16, as best shown in Fig. 1. These stub axles 21 provide pivots about which the side frame members M can swing in effecting movement of the bowl B to loading and carrying positions.

As will be understood, the scraper is adapted to be drawn by a tractor or similar form of motor vehicle, and for coupling the scraper to a motor vehicle, a draft bar 22 is provided. This draft bar 22 is formed with a U-shaped yoke 23, the parallel portions of which extend between the pairs of plates 15 and 16, where they are pivoted on the stub axles 18.

As best shown in Fig. 2, the plates 15 and 16 are of substantially triangular formation, with their forward and lower ends secured to a pair of scraping implements S. Each scraping implement comprises a concavo-convex body 24 to the lower edge of which is secured a scraping blade 25. At the outer end of the body 24 is secured a vertical plate 26 disposed in the same plane as the outer end of the body and the blade. It will be noted that the outer end of the implement extends beyond the outer plate 16 in order to protect the plate against being damaged by the dirt and rocks.

The bowl B is of the usual construction, except the scraping blade is not carried by the lower transverse edge of the mouth of the bowl, but is mounted separately therefrom. As best shown in Fig. 5, secured to and extending between the inner plates 15 of the side members M, is a ledge 27 of box-like construction. The top of this ledge has substantially the same inclination as the bottom of the bowl, and at its forward edge a scraping blade 28 is bolted to a metal strip 29, the latter being suitably secured to the ledge structure 27. This blade 28 at its ends passes beneath the inner ends of the blades 25 of the scraping implement, and, as shown in Fig. 1, the two scraping implements converge rearwardly to the scraping blade 28. The purpose of this arrangement will be described hereinafter.

At the inner ends of the scraping implements S vertical plates 30 are secured to and extend across the opposite ends of the ledge 27, so as to span the space between the bowl B and the scraping implements S and thus prevent earth from passing between the two back onto the ground and in front of the wheels.

Means is provided for elevating the bowl B, the ledge 27 and the scraping implements S from a scraping or loading position to a carrying position. This means, in the present instance, comprises a pair of hydraulic rams R, the cylinders of which are pivoted as at 31 to brackets 32 fixed to the yoke 23. The pistons of the rams have the rods 33 thereof, pivotally connected to pins 34 secured to and extending between the plates 15 and 16 of the side frame members.

Means is also provided for moving the bowl B to the dumping position shown in broken lines in Fig. 2, and this means, in the present instance, comprises a pair of hydraulic rams R¹, disposed at opposite sides of the bowl and having the cylinders thereof pivotally connected to brackets 35 secured to a cross plate 36 extending between and secured to the plates 15 and 16. The pistons of the rams have the rods 37 thereof pivotally connected as at 38 to brackets 39 secured to the sides of the bowl.

The operation of the carrying scraper just described, is as follows: With the parts of the scraper in the position shown in Figs. 2 and 5, the blade 28 is in scraping contact with the ground so that, under forward movement of the scraper, earth is scraped from the ground into the bowl. Likewise, the blades 25 of the scraping implements are in contact with the ground to scrape earth therefrom and form level paths for the wheels W. By reference to Fig. 1, it will be seen that the two scraping implements are disposed transversely of the paths which the wheels W will track, and, therefore, under the scraping action of the implements, these paths will be leveled to form level surfaces over which the wheels can move. As a result of the ground leveling action of the scraping implements, the two wheels W are caused, at all times, to travel over ground which is substantially level so that the bowl B is supported in a level position. In consequence, the blade 28 is, likewise, maintained in a level position to scrape the ground to a level plane, and thereby cause the scraper to perform its intended function of leveling a stretch of ground.

Because of the converging arrangement of the scraping implements S, the earth scraped from the ground by the implements, is guided first onto the blade 28, then onto the ledge 27, and finally into the bowl B. Thus, for a given wheel tread, the leveling path formed by the scraper is increased in width over that of previous scrapers.

As will be observed from a consideration of Fig. 1, the scraping implements S extend laterally beyond the plates 16 and, hence, laterally beyond the wheels W. In consequence, the outer or forward ends of the implements may function to scrape the ground at the base of vertical embankments or curbings, so that the bowl blade and the implements may coact in scraping a roadway from one bounding curbing or embankment to the other.

Once the bowl is loaded with earth, the scraping implements and the blade 28 may be lifted clear of the ground by operation of the rams R. With pressure fluid supplied to the cylinders of the rams so as to move the pistons rearwardly, the rods 33 will force the side frame members M rearwardly and upwardly about the stub axles 21 as a center. This movement of the side members is sufficient to lift the scraping implements and the bowl blade 28 clear of the ground, and also to tilt the bowl rearwardly so as to hold the earth therein.

With the scraper in the earth carrying position just described, it is ready for movement to any destination for discharging its load. Earth may be dumped from the bowl by moving the latter to the dumping position shown in broken lines in Fig. 2, through operation of the rams R¹. By supplying pressure fluid to the cylinders of the rams so as to move the piston rods 37 rearwardly, the bowl is caused to swing upwardly about the stub shafts 20 as a center and until it reaches a position in which all earth is discharged from the bowl. Obviously, all parts of the scraper can be restored to their normal positions by supplying pressure fluid to the other side of the pistons for the rams R and R¹ to draw the piston rods into the cylinders.

The other form of carrying scraper shown in Figs. 3, 4, and 6, comprises a rectangular frame F having side beams 40, a front beam 41, and a rear beam 42. Connected to the front beam 41 is a draft bar 43 braced by converging beams 44, and by which the scraper is adapted to be drawn by a tractor.

A bowl B¹ is pivotally mounted adjacent its forward end, within the frame F by means of pins 45 secured to the sides of the bowl and rotatably fitted in plates 46 secured to and depending from the side beams 40. The mouth of the bowl at its lower edge is provided with the usual scraping blade 47.

Rotatable in the side beams 40 and in ears 48, is a shaft 49ᵃ to the ends of which arms 49 are fixed in pairs to extend forwardly to opposite sides of the frame F. The arms of each pair are braced by a cross plate 50, and at their forward ends they are provided with bearings 51 in which a stub axle 52 is journaled, and on this stub axle between the arms, is a wheel W¹.

A bracket 53 is fixed to and rises from the rear beam 42 and the adjacent side beam 40, and provides a support for the cylinder 54 of a hydraulic ram R². The cylinder is pivoted at its upper end to the bracket by a pin 55, while the rod 56 of the piston is pivotally connected as at 57 to the inner of the two arms 49.

The two pairs of arms 49 and the two rams R², constitute a mechanism by which the wheels W¹ can be actuated to move the frame F vertically for varying the vertical position of the bowl B¹, as will be more fully described hereinafter.

A second mechanism is employed to swing the bowl B¹ upwardly about the pivots 45 to the dumping position shown in broken lines in Fig. 4. This mechanism comprises two hydraulic rams R³ each of which has its cylinder 58 pivoted as at 59 to ears 60 secured to the upper side of the respective side beam 40. The piston rod 61 of the ram is pivoted as at 62 to a short crank arm 63 fixed to a shaft 64 journaled in bearing sleeves 65 fixed to the front beam 41. Likewise, fixed to the shaft 64 is a long crank arm 66 which extends rearwardly and is connected to the adjacent side of the bowl B¹ by a link 67.

Manifestly, when pressure fluid is supplied to the cylinders 58 to drive the pistons forwardly, the rods 61 will be advanced to move the cranks 63 and 66 and the link 67 to the positions shown in broken lines, thereby swinging the bowl to the dumping position shown in broken lines.

As in the first form of my invention, the scraper embodies two scraping implements S¹ of substantially the same construction as the implements S and for the same purpose of scraping the earth in advance of the wheels W¹ to form level paths over which the wheels travel, to in turn, maintain the bowl B¹ and its blade level to insure the scraper leveling the ground as intended, as well as to guide the earth scraped up by the implements, into the bowl.

The same reference numerals, but with the exponent a have been employed on the drawings, to designate the same elements of the implements as in the first form of my invention.

The implements S¹ are supported by uprights 68 fixed to the side beams 40 of the frame, and to the forward edges of the plates 46. As shown in Figs. 3 and 6, the vertical guide plates 30a are secured to the inner ends of the bodies 24, there being no ledge 27 as in the first form of scraper.

From the preceding description of the second form of scraper, its mode of operation will be apparent, except the various positions to which the bowl B¹ may be moved through actuation of the rams R². By referring to Fig. 4, it will be seen that the bowl is in a scraping or loading position, wherein the blade 47 engages the ground, while the bottom of the bowl is spaced slightly from the ground. Also, in this position the blades 25a are in scraping engagement with the ground.

When the rams R² are actuated to force the wheels W¹ downwardly, the latter will occupy the position shown in broken lines in Fig. 4, to elevate the bowl to a carrying position to lift the blade 47, as well as the implement blades 25a free of the ground. This carrying position of the bowl is shown in broken lines and in relation to the ground line shown in broken lines.

Should the rams R² be actuated to swing the arms 49 upwardly about the pivots 49a as a center, the wheels W¹ will be elevated to cause the bowl to be lowered onto the grounds, and the blades 47 and 25a into scraping position. This is another earth loading position of the scraper which is resorted to only when scraping exceptionally hard earth, for the bowl being on the ground exerts a downward thrust which causes the blades 47 and 25a to penetrate the hard earth. Conventional diggers 69, 69, may be initially employed to loosen the earth in advance of the blade 47, when they are removed from the scraper. These diggers are fixed on flat posts 70 removably suspended from brackets 71 by pins 72.

Although I have herein shown and described only two forms of carrying scrapers each embodying my invention, it is to be understood that various changes and modifications may be made therein without departing from the spirit of my invention and the spirit and scope of the appended claims.

I claim:

1. In a two wheel carrying scraper; a frame; a draft bar pivoted on said frame; a pair of wheels pivotally supporting said frame; a bowl pivotally supported on said frame between said wheels to occupy carrying and dumping positions; means operatively connecting said bowl with said frame for moving the bowl to and from a dumping position; means operatively connecting said frame with said bar for elevating said bowl from a loading position to a carrying position; and implements carried by said frame and extending to opposite sides of said bowl for scraping the earth in advance of said wheels, to form level paths therefor, and to guide the earth thus scraped into said bowl.

2. In a carrying scraper; a pair of frame members each comprising a pair of spaced plates; a draft bar having a yoke the arms of which are pivoted to said members between said pairs of plates; a pair of wheels pivotally supporting said members; a bowl pivotally supported on and between said plates to occupy loading, carrying and dumping positions; scraping implements secured to said frame members for leveling the earth in advance of said wheels; means operatively connecting said bowl with said frame members for moving the bowl about its pivot to occupy carrying and dumping positions; and means operatively connecting said frame members with said yoke arms for actuating said frame members to elevate said bowl to carrying position, and said scraping implements clear of the ground.

3. In a carrying scraper; a frame; a pair of wheels pivotally supporting the frame; a bowl pivoted on the frame; scraping implements carried by said frame and disposed in advance of said wheels for leveling the ground to provide level paths for the wheels, said implements converging to the mouth of the bowl for directing earth scraped from the ground into the bowl; and members secured to and extending rearwardly from the inner ends of said implements so as to be disposed generally longitudinally of the scraper and between said bowl and said implements for preventing earth scraped from the ground by the implements from passing between the latter and the sides of the bowl.

4. In a carrying scraper; a frame; a pair of wheels pivotally supporting the frame; a bowl pivoted on the frame; scraping implements carried by said frame and disposed in advance of said wheels for leveling the ground to provide level paths for the wheels, said implements converging to the mouth of the bowl for directing earth scraped from the ground into the bowl; and plates at the inner ends of said implements extending generally longitudinally of the bowl so as to span the space between the inner ends of the implements and the sides of the bowl.

5. In a two wheel scraper; a pair of wheels; a pair of spaced side members secured one to the other and pivoted at their lower rear portions to said wheels; a yoke pivoted to said members in advance of said member pivots; a scraping bowl between said wheels and members and pivotally suspended from the upper portion of said members; means connected to said members between the bowl pivots and the member pivots for moving said bowl to and from dumping position; and means connected to said yoke and said members for elevating said bowl from loading position to carrying position.

6. In a two wheel scraper; a pair of wheels; a pair of spaced side members of triangular form secured one to the other and pivoted at their lower rear corners to said wheels; a yoke having the arms thereof pivoted to said members in advance of said member pivots and substantially at the same level thereof; a scraping bowl between said wheels and pivotally suspended from the upper corners of said members; hydraulic rams pivotally connected to said members between the bowl pivots and the member pivots for moving said bowl to and from dumping position; and hydraulic rams pivotally connected to said yoke and to said members at points substantially opposite the connections of the first mentioned rams to said members, for elevating said bowl from loading position to carrying position.

7. In a two wheel scraper; a pair of wheels; a pair of spaced side members of triangular form secured one to the other and pivoted at their lower rear corners to said wheels; a yoke having the arms thereof pivoted to said member in advance of said member pivots and substantially at the same level thereof; a scraping bowl between said wheels and pivotally suspended from the upper corners of said members; hydraulic rams pivotally connected to said members between the bowl pivots and the member pivots for moving said bowl to and from dumping position; hydraulic rams pivotally connected to said yoke and to said members at points substantially opposite the connections of the first mentioned rams to said members, for elevating said bowl from loading position to carrying position; and implements secured to said members at the lower forward corners thereof, for levelling the earth in advance of said wheels and directing the earth into said bowl.

HAROLD D. KADZ.